United States Patent
Seydoux (10) Patent No.: US 8,035,632 B2
(45) Date of Patent: Oct. 11, 2011

(54) DIGITAL IMAGE PICTURE FRAME WITH SELF-ADAPTIVE CONTROL OF BRIGHTNESS LEVEL

(76) Inventor: Henri Seydoux, Paris (FR)

(*) Notice: Subject to any disclaimer, the term of this patent is extended or adjusted under 35 U.S.C. 154(b) by 791 days.

(21) Appl. No.: 11/989,098

(22) PCT Filed: Aug. 3, 2006

(86) PCT No.: PCT/FR2006/001879
§ 371 (c)(1),
(2), (4) Date: Jun. 11, 2008

(87) PCT Pub. No.: WO2007/015009
PCT Pub. Date: Feb. 8, 2007

(65) Prior Publication Data
US 2009/0167736 A1 Jul. 2, 2009

(30) Foreign Application Priority Data
Aug. 3, 2005 (FR) ...................................... 05 08274

(51) Int. Cl.
G06F 3/038 (2006.01)
G09G 5/00 (2006.01)
(52) U.S. Cl. .......................................... 345/207; 40/714
(58) Field of Classification Search .................... 345/87, 345/204, 156, 76, 82, 60, 690, 207, 104; 40/735, 700, 714–716, 721
See application file for complete search history.

(56) References Cited

U.S. PATENT DOCUMENTS

| 6,400,996 | B1 | 6/2002 | Hoffberg et al. ................. 700/83 |
| 6,441,828 | B1 * | 8/2002 | Oba et al. ....................... 345/659 |
| 6,535,770 | B1 * | 3/2003 | Van Laethem ................... 700/83 |
| 2002/0126150 | A1 | 9/2002 | Parry ............................. 345/771 |
| 2003/0098831 | A1 | 5/2003 | Chen .............................. 345/87 |
| 2003/0122781 | A1 | 7/2003 | Koo ............................... 345/158 |
| 2005/0126061 | A1 | 6/2005 | Lin ................................ 40/735 |

FOREIGN PATENT DOCUMENTS

| EP | 1213702 B1 | 6/2006 |
| JP | 2003169734 A | 6/2003 |
| JP | 2004295033 A | 10/2004 |

* cited by examiner

Primary Examiner — Stephen Sherman
(74) Attorney, Agent, or Firm — Haverstock & Owens LLP

(57) ABSTRACT

The picture frame comprises: a decorative frame (18), support or hanging means (22, 24), a display screen (12), a driver circuit (46, 48) for driving the screen, and a processor (32). It further includes wireless interface means (34), in particular of the Bluetooth type, for interfacing with a remote appliance such as a mobile telephone in order to receive therefrom digital image data blocks, each corresponding to an image for storing in a memory (40) and for displaying on the display screen. In the event of a change in the state of a change of a screen orientation sensor (50), the processor applies pivot processing to the image data so as to restore the initial orientation of the displayed image. The picture frame also includes self-adaptive means for controlling its brightness level and suitable for detecting and storing successive changes of state in a sensor and for extrapolating from said changes an automatic control relationship for controlling the brightness level of the screen.

13 Claims, 4 Drawing Sheets

DIGITAL IMAGE PICTURE FRAME WITH SELF-ADAPTIVE CONTROL OF BRIGHTNESS LEVEL

The invention relates to a digital image picture frame.

The picture frame is an independent device for displaying digital photographs on a screen, and it is designed to be used in the same manner as a frame containing a traditional photograph.

More precisely, the picture frame of the invention is a device designed around a simple electronic hardware architecture made using standard components. It does not have connectors or multiple control buttons, unlike certain sophisticated technology products offered as accessories in the field of digital photography.

These characteristics make it possible to envisage a mass-market product that can be bought or given in the same manner as a frame for receiving a traditional photograph, being externally identical thereto and being designed to be used in the same manner, e.g. by being hung or by being stood on a table, a mantelpiece, a piano, etc. . . . . .

This appearance and use comparable to that of traditional picture frames can be emphasized by associating the device proper with a decorative frame that is original (leather, precious wood, silver, etc.), and possibly interchangeable, thus making it possible to make available a very varied range of products and to further dispel its technological aspects, so as to enable such frames to be incorporated as decorative articles in all kinds of interior.

Various independent devices are already known that are capable of displaying digital photographs on a screen.

Thus, JP-A-2003-169734 discloses a device for displaying digital images that have been selected and downloaded from a remote site over a wireless communications connection. That document describes various image processing functions, in particular automatic rotation and redimensioning.

US-A-2002/126150 likewise discloses a device for displaying digital images that are transmitted from an external appliance such as a digital camera or a personal digital assistant (PDA). Image transfer is activated by an appropriate command to the camera or the PDA, and the image can be loaded over a wireless connection such as a Bluetooth connection (trademark registered by Bluetooth SIG, Inc.).

That technique makes it possible in particular to avoid having any recourse to connectors, cables, or memory cards, or even to multiple control buttons, with the picture frame being controlled directly from the appliance with which it is interfaced.

Nevertheless, if it is desired to use a digital image display device in the same manner as a traditional frame, a particular problem arises, namely that of managing the brightness of the screen, and in particular of managing the back-lighting of the display, which is generally of the liquid crystal display (LCD) type or the like, i.e. the display does not itself have means for emitting light.

Known devices, such as those described in above-mentioned JP-A-2003-169734 and US-A-2002/126150 are sophisticated technical products, e.g. made available as accessories in the field of digital photography. They are designed as nomadic products, for displaying or presenting images to a group of people on a display that is larger in size than the display on a digital camera.

Those devices are switched on or off using a button made available to the user and as a function of the usage that is being made of the appliance. In contrast, for a picture frame that is to remain permanently hung or stood on a support in a living room, a bedroom, . . . , it would be tiresome to require the user to switch the device on and off as a function of circumstances and of the user's activity.

Unfortunately, an LCD display, even when of small size, emits a large amount of light for a bedroom at night. If it is desired to be able to place the picture frame anywhere, it is therefore absolutely essential for it to switch off automatically at the appropriate time in order to avoid being a nuisance.

Furthermore, an LCD display has a lifetime that is limited as a function of the number of hours it has operated; switching it off when it is not in use therefore increases its lifetime correspondingly.

It is known how to control the brightness level of a device by means of a brightness sensor. The sensor switches the display of the device on or off as a function of predefined thresholds; it can also cause the brightness level of the display to vary continuously as a function of ambient brightness.

In the particular application envisaged for the present invention, that technique has been found to be ineffective in practice.

The picture frame can be installed in a very wide variety of locations, where brightness conditions are not comparable: on a table close to a window that receives a large amount of light, or conversely on a bookshelf, more or less in the shade of its uprights. Furthermore, depending on the season (summer/winter), natural lighting conditions and the use of artificial light vary over very wide ranges.

One of the objects of the invention is to provide a digital image picture frame that is provided with intelligent automatic means for controlling the brightness level of the display screen (i.e. the display), capable of controlling brightness in a wide variety of situations, while being capable of taking a decision rapidly concerning switching on or off (for example switching the display off within one minute of the light being switched off in a bedroom).

The picture frame of the invention is a device of the general type that is known from above-mentioned JP-A-2003-169734, i.e. comprising: a decorative frame; means for supporting or hanging the frame; a display screen incorporated in the frame and suitable for displaying an image in the form of a matrix of pixels; a driver circuit for driving the display screen; processor means suitable for delivering image data to the driver circuit for display on the display screen; wireless interface means for interfacing with a remote appliance, said means being activatable by said appliance in such a manner as to receive therefrom digital image data blocks, each corresponding to an image for display on the display screen; memory means for storing image data blocks as received in this way and co-operating with the processor means; means for lighting the display screen; and means for automatically controlling the brightness level of the screen.

In manner characteristic of the invention, the means for automatically controlling the brightness level are self-adaptive means including means suitable for detecting and storing successive changes of state of at least one sensor and for extrapolating from said changes a relationship for controlling the brightness level of the screen.

The means for automatically controlling brightness level may comprise an ambient lighting level sensor, and/or a change-of-position sensor, and/or an ambient sound level sensor, and/or an internal clock.

In particular, the means for automatically controlling lighting level may comprise a state machine suitable for analyzing the sequence of changes of state of a plurality of sensors and for modifying the brightness level of the screen on detecting one or more predefined sequences of changes of state, and they are preferably self-adaptive means including means suitable for detecting and storing successive changes of state of at least one sensor and for extrapolating from said changes a controlled relationship for controlling the brightness level of the screen.

In particularly advantageous manner, the display screen is a rectangular screen; the picture frame further includes an orientation sensor for sensing the vertical or horizontal orientation of the display screen; and the processor means are also suitable, in the event of a change of state of the orientation sensor, for applying pivot processing to said image data and for delivering the image data as processed in this way again to the driver circuit for display on the display screen in such a manner as to restore the initial orientation of the image as displayed.

Under such circumstances, the support or handing means are preferably suitable for supporting or hanging the frame in a single vertical position and in a single horizontal position; the orientation sensor is then a two-state sensor and the pivot processing is pivot processing through one-fourth of a turn in the direction opposite to the direction corresponding to the change of state in the orientation sensor.

Advantageously, in order to adapt the format, and possibly the orientation of the image to the format of the display screen, the processor means apply definition-reducing scaling to the image contained in the image data block received by the wireless interfacing means, down to a value that is not greater than the definition of the screen in each of its two corresponding dimensions of width and length.

Under such circumstances, the picture frame may in particular comprise a sensor for sensing the vertical or horizontal orientation of the display screen; and if the vertical or horizontal orientation of the image itself does not correspond to the vertical or horizontal orientation respectively of the display screen as determined by the orientation sensor, the processor means are also suitable for then applying additional definition-reducing scaling to the image that has already had its resolution reduced in scale, down to a value that is not greater than the definition of the screen in each of its two corresponding dimensions, respectively in width and in length.

For even greater standardization of the product, the picture frame may include a plurality of driver circuits for display screens of respective different types, said display screen of the picture frame being coupled to that one of the driver circuits that corresponds to its own type.

Furthermore, according to various advantageous subsidiary characteristics:

the wireless interface means for interfacing a remote appliance are also suitable for receiving therefrom parameter data for setting the processor means;

the picture frame also includes a button for resetting the processor means to zero; and the processor means are suitable for delivering in sequence a series of successive images stored in said memory means.

There follows a description of an embodiment of the device of the invention given with reference to the accompanying drawings in which the same numerical references are used from one figure to another to designate elements that are identical or functionally similar.

Figure 1:
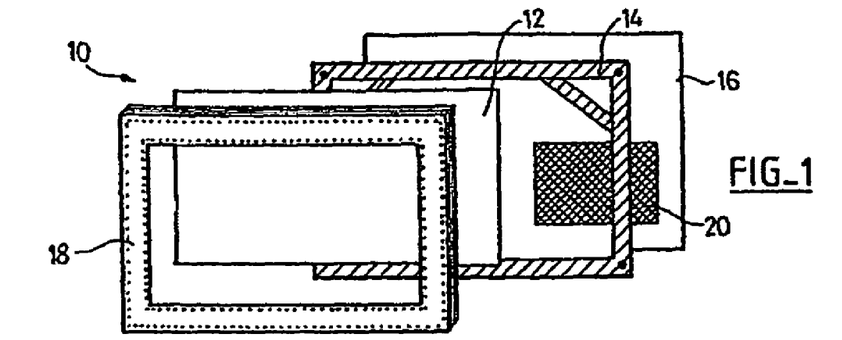
FIG. 1 is an exploded view showing how the various elements making up the picture frame of the invention.

FIG. 1 shows the main elements of the picture frame 10 of the invention, which comprises a display screen 12 mounted on a support 14 that receives a visible decorative frame 18, that is optionally removable. The rear of the assembly is closed by a back wall 16 that also supports an electronics card 20.

At the back (FIG. 2), the picture frame 10 is provided with a fold-away prop 22 enabling the frame to be positioned horizontally or vertically, and two hanging fittings 24 enabling the frame to be hung on a wall like a painting. The picture frame also includes a main lead 26, possibly together with a manually-operated switch 28 (it is explained below that the picture frame may advantageously also include a system for automatically controlling switching on and off).

Figure 2:
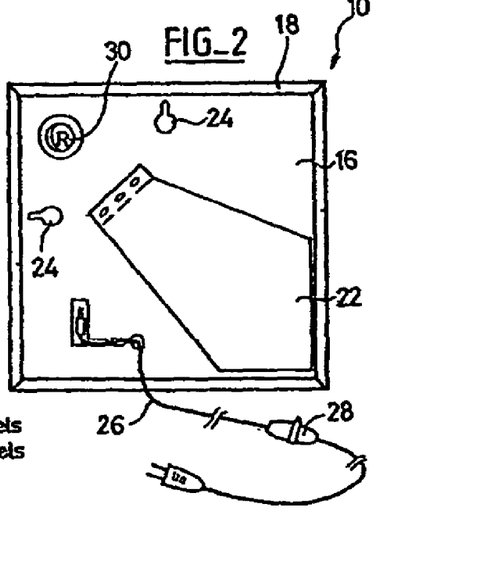
FIG. 2 is a back view of the FIG. 1 frame, once assembled.

Also at the back, there is an on/off button 30 that can be used for a general reset (by being pressed for a long time) which constitutes the only control directly accessible to the user, with interfacing otherwise generally taking place using wireless means.

It is nevertheless possible to make provision in addition for navigation keys (not shown) of the "right-arrow/left-arrow/confirm (OK)" type, in particular to enable the user to cause a plurality of images stored in memory to scroll at will on the screen until the image the user desires to display permanently has been found.

Apart from the electricity lead, the device of the invention is thus entirely similar to traditional photograph frames, which characteristics can be emphasized by an appropriately selected decorative frame 18, and by taking care to ensure that parts made of plastics material are not visible.

For rationalization purposes, the display screens used are standard displays, available at low price from manufacturers, e.g. displays having the following formats:

2.2 inches (mobile telephone screen), definition 128*160 pixels;

¼ VGA (screens for a personal digital assistant), definition 140*320 pixels; and VGA, definition 480*640 pixels.

Figure 3:
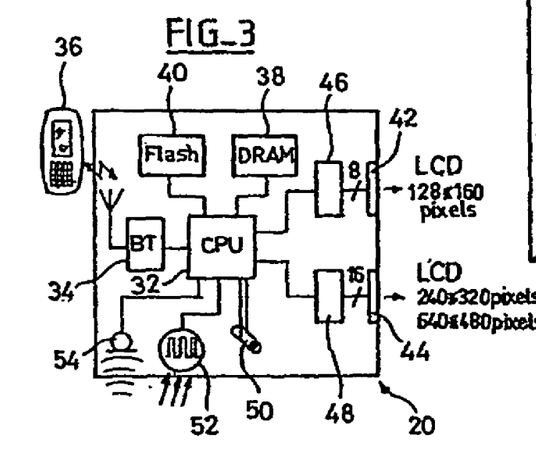
FIG. 3 is a diagram showing the various functional blocks of the frame and the manner in which they are interconnected.

FIG. 3 shows the various elements making up the electronics circuit 20 of the invention. It is designed around a central processor unit (CPU) 32 that may be of a conventional type as used in personal digital assistants (PDAs), or smartphones, e.g. Cirrus 9307 or Samsung 2410.

The CPU 32 is associated with a wireless interface circuit 34, typically a Bluetooth type circuit, likewise of conventional type, enabling a connection to be established with a mobile telephone 36 or a microcomputer in order to load images for display and control the various functions of the picture frame. The Bluetooth interface is a both-way radio interface of specifications that make provision, amongst other things, for the possibility of sending commands and data files, in particular digital image files, to a remote device. Furthermore, the presence of the mobile telephone within the active range of the device can be detected in entirely automatic manner without the user having to perform any manipulation in order to activate the connection between the telephone and the device, where such a connection can become immediately operational as soon as the user penetrates together with the telephone within the active range of the device. This detection is advantageously performed on a continuous basis by the device, as a background task.

In a variant, or in addition, the interface may be of a type other than Bluetooth, for example it may be of the WiFi type, in order to provide a connection with a computer fitted with that type of interface.

The CPU 32 is associated with a dynamic random access memory (DRAM) 38 to enable it to perform various kinds of digital image processing as described below, and also with an image storage memory 40, e.g. a flash memory having a capacity of 16 megabits (Mbits) (enabling about twenty non-compressed images at "telephone screen" definition to be stored), or of 32 Mbits (enabling about fifteen images to be stored at ¼ VGA definition). It is also possible to load a plurality of images into the flash memory 40, which images are displayed either on request (from a command sent by the mobile telephone 36, or from navigation keys of the "right-arrow/left-arrow" type if provided on the picture frame), or else by scrolling continuously to provide a "slideshow" type display. Under such circumstances, the viewing time for each image (e.g. once every 20 seconds) is advantageously settable, using a command sent by the mobile telephone 36.

The memory 40 may also be preloaded in the factory with a series of images such as reproductions of famous paintings that are subsequently replaced by personal images belonging to the user.

The circuit 20 has connectors 42, 44 for connecting to a display, the connectors being associated with interfacing circuits 46, 48. Advantageously, for industrial rationalization purposes and in order to take account of the fact that the major part of the cost of electronic components lies with the display and not with the processing and interfacing components, a single electronic circuit 20 incorporates connectors and driver circuits for the various display sizes mentioned above, i.e. 128*160 pixels, or indeed 140*320, or 480*640 pixels. The circuit 20 is thus equally suitable for being connected to any one of those three types of display, with the software of the CPU naturally being designed to manage all the display sizes.

The circuit 20 may advantageously include a position detector 50, e.g. a ball serving to determine whether the picture frame is stood up or hung in the vertical direction ("portrait" format) or else in the horizontal direction ("landscape" format). If as shown in FIG. 2 the support and hanging means allow for only one vertical position and only one horizontal position, then the sensor 50 may be a simple two-state sensor, insofar as there is no need to distinguish between the up and the down directions, since there are only two possible positions and not four.

The circuit 20 also includes a lighting sensor 52 serving to control the back-lighting of the display as a function of ambient conditions, i.e. to switch off or switch on the picture frame in the manner that is described below in greater detail with reference to FIGS. 5 to 10.

A sound level sensor 54 may also be used for controlling back-lighting, as a variant or additionally.

There follows a description of the functions of the picture frame of the invention.

Firstly, insofar as the resolution and/or the orientation of the original image need not necessarily correspond to the definition and/or the orientation of the display, redimensioning processing is needed.

Figure 4:
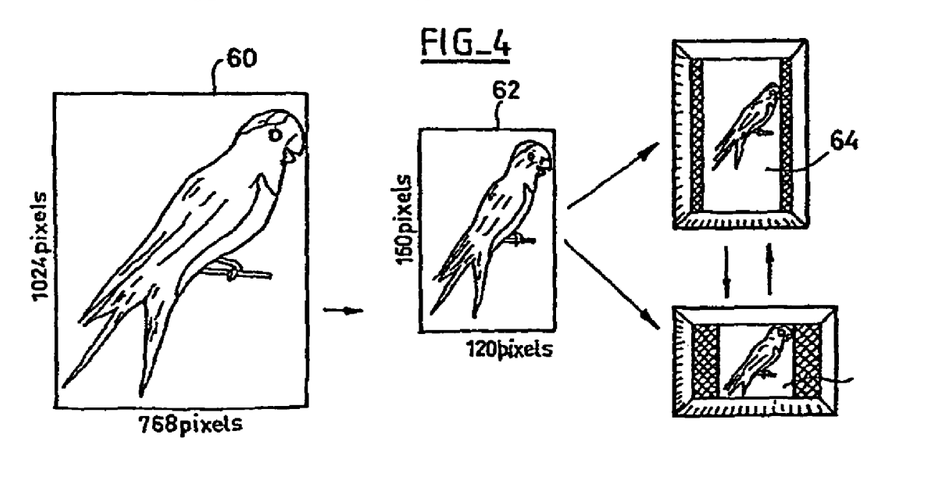
FIG. 4 shows how the definition of an original image is readjusted in order to adapt to the dimensions and the orientation of the screen of the frame.

This processing is explained with reference to FIG. 4.

Reference 60 designates an original image sent by the CPU 32 over the wireless interface 34. For example, it is constituted by a compressed JPEG image having 768*1024 pixels. The JPEG image is decompressed and loaded into the DRAM 38, after which it is redimensioned to the format of the display. For example, if the format on the display is of the "mobile telephone" type, having 120*160 pixels, then the image is subjected to scaled resolution reduction so as to give the smaller image 62 of FIG. 4.

This scaled reduction is implemented by taking the largest dimension, height or width, in pixels of the original image 60, with the scale factor being determined by dividing said value by the greatest value, height or width, of the display; if the other corresponding value, i.e. respectively the width or the height, after scaling is greater than the corresponding value of the display—as can happen in particular for a square image—then the calculation of the scale factor is performed using said other value.

The following step consists, where necessary, in adapting the image as reduced in this way to the orientation of the display. This adaptation is performed not only when the image is received from the outside and processed, but also wherever the CPU 32 is informed about a change in the orientation of the picture frame, as detected by a change in the state of the sensor 50: thus, at any time, if someone takes hold of the picture frame and turns it through one-fourth of a turn, the image will be immediately and automatically reestablished—and redimensioned accordingly—with the proper orientation (as shown at 64 and 66 in FIG. 4). This adaptation to the orientation takes place by performing a new scaling calculation, which is performed in the same manner as above.

Most advantageously, the picture frame of the invention is provided with a system for servo-controlling the back-lighting of the display, which system is controlled automatically and autonomously by the ambient lighting sensor 52, by the ambient sound level sensor 54, and/or by the clock internal to the device. This consists in particular in switching off the back-lighting at night since it would be troublesome to keep the picture frame switched on in a bedroom.

Advantageously, the back-lighting is switched off under the control of a self-adaptive recognition algorithm. For this purpose, for periods of 24 hours as measured by the internal clock of the CPU, the algorithm determines which eight hours have the least activity (when light level is at its lowest and/or when the sound level is at its lowest), and it evaluates day after day the end points of this low-activity period and it analyzes their stability. This is implemented by a recognition algorithm suitable for identifying transitions between two states, and/or for recognizing two different situations with a high level of confidence.

In any event, the user can always switch the device off manually by means of the switch 28 (where this operation is equivalent to unplugging the appliance) or by using the on/off pushbutton 30 (with this operation merely switching off back-lighting, while the CPU remains powered and active).

Figure 5:
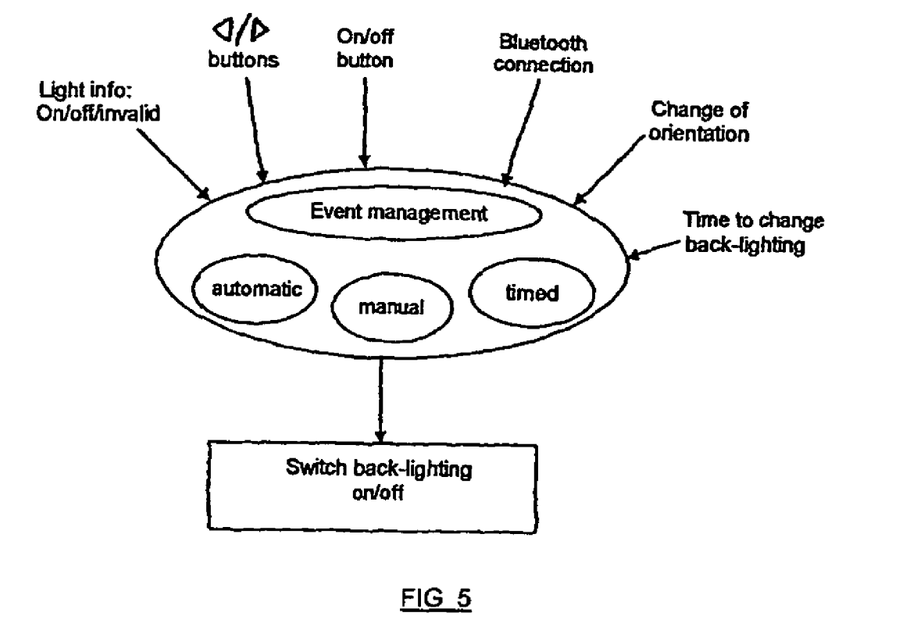
FIG. 5 is a diagram showing the various parameters and operating modes involved in controlling the brightness level of the display of the device of the invention.

FIG. 5 is a diagram showing the various parameters and operating modes involved in controlling the brightness level of the display of the device of the invention.

In this example, the brightness level of the display is managed in an on/off manner, i.e. the display is either on, or else off, however it is also possible to envisage management that is more complex, with one or more intermediate levels of brightness.

The user can select between three modes of operation:
- "automatic": this mode implements an algorithm, as described below, for determining whether the display should be switched on or off as a function of a certain number of parameters and criteria, in particular on the basis of measurements of ambient brightness picked up by the sensor of ambient lighting level;
- "manual": the display remains switched on or off continuously. The changeover from one state to the other is controlled by the user pressing on the "on/off" button 30 and/or under remote control, e.g. using a mobile telephone via the Bluetooth connection; and
- "timed": the display is switched on or off at preprogrammed times configured by the user using a mobile telephone as a remote control via the Bluetooth connection.

By default, the mode selected is automatic mode. Manual mode or timed mode are activated only on a specific command from the user—where such activation may be permanent (i.e. a new user command is needed to return to automatic mode), or temporary (with a return to automatic mode, e.g. whenever 24 hours have elapsed).

In any event, whatever the management mode of the display, the ambient lighting level measurement remains active, both when the frame is switched on and when it is switched off.

This means that switching the display on and off has no effect on the execution of the algorithm for managing automatic mode. In other words, whatever the mode selected, it is only the switching on or off of the display that is controlled, and there is no interruption in the operation of the processor, and the lighting level sensor continues to provide the processor with data, so the processor executes the above-described algorithm in uninterrupted manner. Even if the user switches the frame off manually, that is merely a command of the type "the user desires not to see the image". Execution of the algorithm can be stopped only by unplugging the appliance (a situation that is described below).

The switching on and off of the display depends on various criteria, corresponding to events defined by:
- the setting of an "on", "off", or "invalid" flag (where invalid designates the situation in which automatic mode cannot be implemented in satisfactory manner), as a function of variations in ambient lighting levels picked up by the sensor and analyzed by the algorithm;
- a key-press, if any, on a navigation key (right arrow, left arrow, confirmation);
- a key-press on the "on/off" button 30;
- detecting information transmitted over the Bluetooth connection;
- detecting a change in the state of the orientation sensor 50; and
- a match between the internal clock of the processor and a predetermined time for switching the display on or off.

Detecting a key-press on the "on/off" button causes the display to be switched on if it was off (and vice versa), for a predetermined duration, e.g. 1 hour (if the selected mode is automatic mode or timed mode), or without limit on duration if the selected mode is manual mode.

Detecting a key-press on a navigation key, or detecting transmission over the Bluetooth connection, or detecting a change in orientation, causes the display to be switched on if it is off, and for a predetermined duration, e.g. 1 minute, regardless of the mode that is selected.

Figure 6:
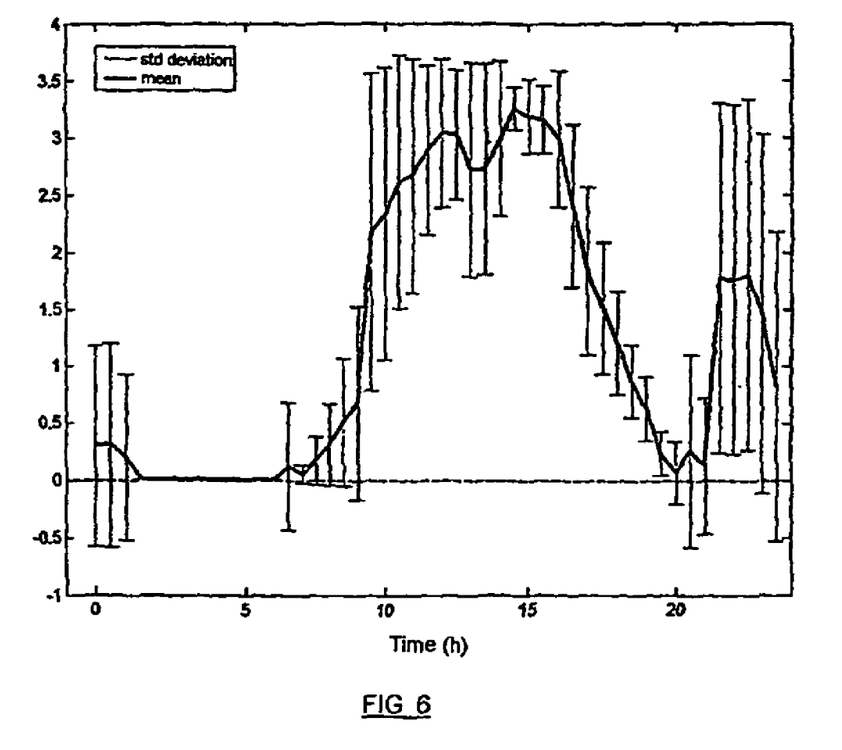
FIG. 6 shows a typical example of variations in ambient lighting level measured over a 24-hour period.

FIG. 6 shows a typical example of variations in ambient lighting level (mean and standard deviation) as observed over successive periods of 24 hours, revealing the large variations that can be encountered from one time of day to another and from one day to another.

Thus, there can be seen slow variations in lighting level (typically day/night variations), together with sudden variations (switching on a light, opening/closing curtains, . . . ), sometimes associated with large standard deviations.

The position of the ambient lighting sensor can then be important in obtaining measurements that are meaningful.

For constraints associated with appearance, the lighting sensor is generally placed on the side of the electronics portion of the unit, being set back from the decorative frame. Although brightness is at its lowest in this location, the measurements taken nevertheless remain usable. It is equally possible to associate the unit with a light guide that opens out at a suitable location of the device.

Figure 7:
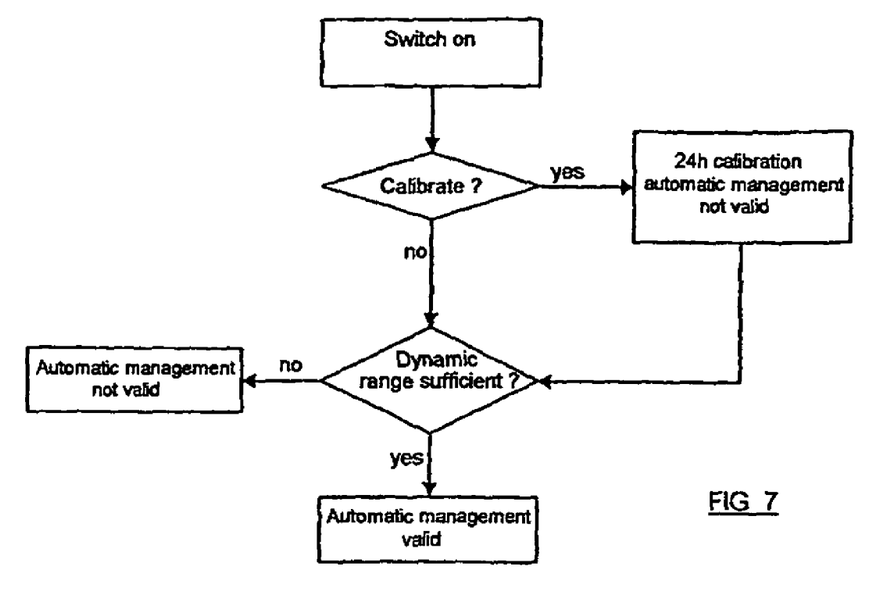
FIG. 7 is an algorithm corresponding to the initial calibration and validation stage of the automatic mode.

When the appliance is switched on for the first time (or after it has been off for a long time), the algorithm embarks on a calibration stage shown in FIG. 7, which stage lasts for a period of 24 hours. During this stage, the appliance remains on. At the end of this calibration stage, the algorithm determines the mean minimum and the mean maximum of the lighting level, i.e. the mean of the ten half-hours presenting the lowest level of lighting or, respectively, the highest level of lighting: these two values provide the dynamic variation in lighting level that can be sensed by the detector.

If this dynamic range is greater than a predetermined threshold, it is considered that the algorithm can operate in satisfactory manner. Automatic management is then confirmed. Otherwise, automatic management is considered to be unreliable and is deactivated.

This calibration serves not only to confirm automatic mode, but also to define trigger thresholds for controlling back-lighting, when switching on and when switching off.

At regular intervals, e.g. once every two seconds, the processor receives a digitized value of the lighting level as delivered by the sensor (two second mean value M2S) that constitutes data input to the automatic management algorithm.

Incidentally, it can be observed that when the user manipulates the buttons of the device, it is very probable that the user will obscure the sensor, and consequently falsify its measurements of ambient lighting levels. Button manipulation is detected as an event, thereby enabling the algorithm to ignore lighting level measurement samples taken during a period preceding and following such manipulation. In order to maintain synchronization of the means over time, the algorithm acts during these periods to generate dummy samples, that are not taken into account when calculating the means.

From the measured M2S values, the algorithm calculates various means for use as a basis in taking decisions: a 20-second mean M20S, a 2-minute mean M2M, and a 30-minute mean M30M.

Figure 8:
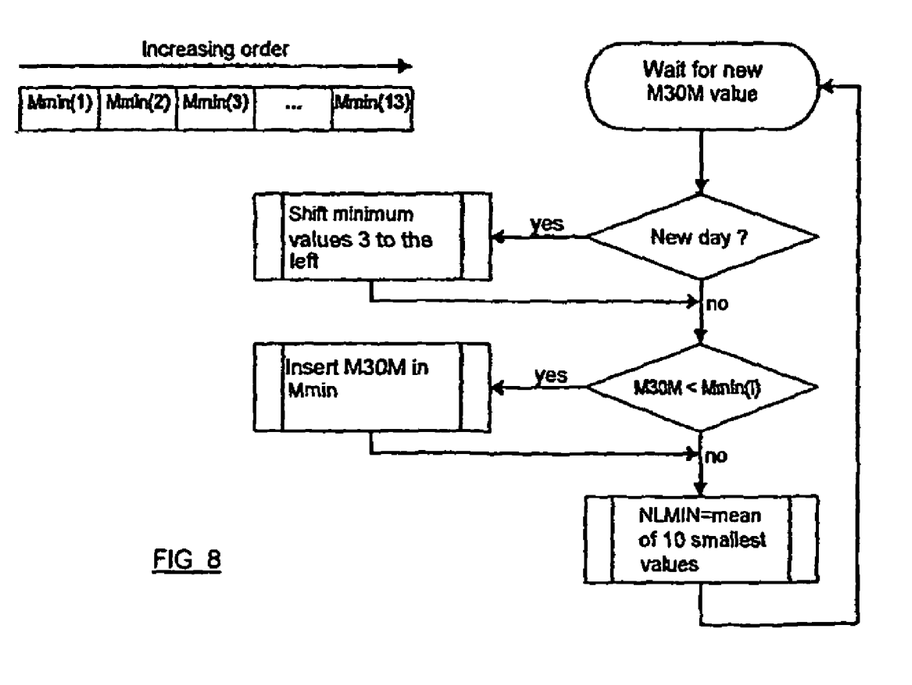
FIG. 8 is an algorithm corresponding to the stage of eliminating conversion spikes or "deglitching".

From the M30M means, the device determines the mean minimum and maximum values Mmin and Mmax that are defined as being the means of the ten largest and of the ten smallest values respectively of M30M. FIG. 8 is a flow chart corresponding to calculating the mean minimum value, with the mean maximum value being calculated in similar manner.

To avoid retaining values that are too extreme, conversion spikes are eliminated in a deglitching operation, which operation consists over each new 24-hour period in replacing the three largest and the three smallest values of M30M by the three largest and the three smallest values of the day.

Starting from the mean minimum values NLMIN and the mean maximum values NLMAX as corrected in this way, the algorithm calculates dynamically transition thresholds TDL (threshold from darkness to light) and TLD (threshold from light to darkness); these two thresholds are different (TDL>TLD) to minimize the risk of oscillating between two states.

By way of example, these thresholds are determined from the values NLMIN and NLMAX by applying the following relationships:

$$TDL=NLMIN+(NLMAX-NLMIN)*0.06$$

$$TLD=NLMIN+(NLMAX-NLMIN)*0.02$$

The lighting levels measured by the sensor are then compared with these thresholds. Since a change in lighting level does not necessarily imply a change of state (switching on or off) for the display, the algorithm requires the crossing of the threshold to be maintained for some minimum length of time before confirming the change of state: in other words there is hysteresis in the operation of the algorithm.

Variations in lighting level are evaluated from means that are calculated continuously, and that are compared with the thresholds TDL and TLD.

The longer the duration of the selected mean, the less it is sensitive to sudden variations, but this is to the detriment of reactivity. To take this constraint into account, the algorithm performs the comparison either with the 2-second mean M2M, or with the 20-second mean M20S, and it does so selectively as a function of short-term variations in the brightness level (it would also be possible to use the 2-minute mean M2M instead of M20S, but with smaller sensitivity to variations and greater latency in response to a change).

Figure 9:
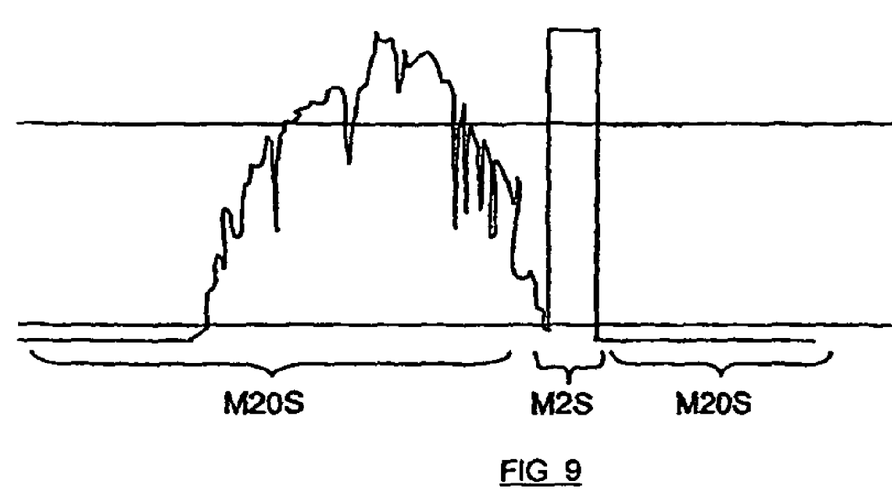
FIG. 9 shows a typical example of a sudden change in lighting level.

FIG. 9 shows typical variation in lighting level including a sudden and major variation, e.g. as the result of opening shutters or switching on the lights in a room.

Figure 10:
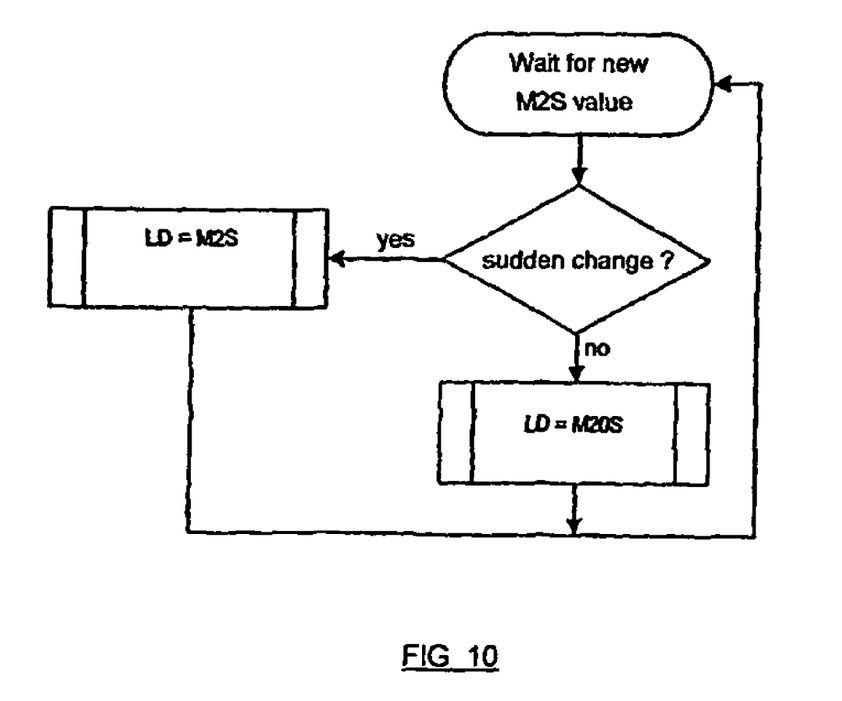
FIG. 10 is an algorithm showing how it is possible to manage such a sudden change.

The corresponding analysis algorithm, as shown in FIG. 10, continuously calculates the ratio between the value of the current M2S lighting level sample and the value that was measured eight samples earlier, and it decides that a sudden change has occurred whenever the ratio between them is, for example, greater than 6 (sudden rise in light level) or less than ⅙ (sudden drop in light level).

With a drop, and providing the variations remain within a range of ±15% of the value prior to the moment when the change was detected, the value LD that is used for deciding whether to switch on or off is the short-term mean M2S, considered as being more representative than the long-term mean M20S. Otherwise, the lighting level value LD that is used is the mean M20S.

On the basis of the above indications, the algorithm can take decisions to switch on or off the display, where necessary, by comparing the value LD it has retained with both of the above-defined transition thresholds TDL and TLD, while also applying a time delay (hysteresis effect). Various variants and additions can be envisaged in implementing the algorithm of the invention.

For example, it is possible to improve decision taking by compiling data sensed over a plurality of successive days with, for each period, calculation being performed at regular intervals to determine a mean and a standard deviation, e.g. at intervals of 30 minutes. The algorithm then builds up a typical lighting profile using the intervals of preceding days. This profile can be used in particular in situations where the device is unplugged and then plugged back in again: the algorithm compares the values taken after the device has been plugged back in with the values for a typical day in order to decide whether or not it is appropriate to perform calibration again or whether, on the contrary, it is possible to retain the preceding calibration (where such a situation may correspond, for example, to a short power cut or to an unintentional disconnection, or to the appliance being connected to an outlet that is controlled by a switch).

In another variant, in order to mitigate the fact that the clock internal to the processor is not designed to provide a time display, the algorithm determines a time reference point by estimating the night period from the daily means (where this period is defined as being the longest period of darkness over a day), and then setting markers for the beginning, the middle, and the end of the night. Similarly, the middle of the day can be estimated from the half-hourly lighting level means, if it is assumed that the sun constitutes the main source of light. This approximation can be improved by a calculation in which the corresponding time interval is weighted by the value for the lighting level.

Another addition consists in using the information delivered by the position sensor 50. A change in this sensor indicates that the frame has been manipulated by the user, who might change the position of the lighting level sensor 52, thereby affecting the relevance of the calculated means, and under extreme circumstances, making it necessary to proceed with new calibration.

In another yet variant, a sound level sensor 54 can be used to estimate the level of activity in the room in which the device of the invention is located. A high ambient level of sound can be indicative of the presence of several people having a conversation in the room, i.e. a situation in which it is desirable to switch on the display automatically, or to avoid switching it off immediately.

The invention claimed is:

1. A method for automatically controlling the on/off switching of a display screen of a picture frame for digital photographic images, wherein the picture frame comprises:
   a display screen suitable for displaying an image in the form of a matrix of pixels;
   a driver circuit for driving said display screen;
   processor means suitable for delivering image data to the driver circuit for display on said display screen;
   memory means for storing image data blocks and co-operating with said processor means;
   means for lighting said display screen; and
   means for automatically controlling the brightness level of said screen, including a sensor for sensing an ambient lighting level;
   wherein said method comprises:
   a) determining at regular intervals successive mean values of said ambient lighting level;
   b) determining a mean minimum value and a mean maximal value from said successive mean values over a predetermined time period;
   c) deriving from said mean minimum value and said mean maximal value a darkness-to-light transition threshold and a light-to-darkness transition threshold;
   d) comparing the current ambient lighting level to said darkness-to-light and light-to-darkness transition thresholds;
   e) switching on said display screen upon crossing of said darkness-to-light transition threshold and switching off said display screen upon crossing of said light-to-darkness transition threshold.

2. The method as in claim 1, further comprising, following step a), performing a calibration stage when the frame is switched on for the first time or after the frame has been off for a period, said calibration stage comprising:

determining a dynamic range in lighting level between a mean minimum and a mean maximum of the lighting level;

comparing said dynamic range to a predetermined threshold;

if said dynamic range is greater that said predetermined threshold, confirming automatic control of the on/off switching of the display screen;

if said dynamic range is not greater that said predetermined threshold, deactivating said automatic control.

3. The method as in claim 1, wherein said mean minimum value and mean maximal value are determined over a 30-minute time period.

4. The method as in claim 3, further comprising a deglitching operation including replacing over each new daily period the three largest and the three smallest values of the 30-minute mean value by the three largest and the three smallest values of the day.

5. The method as in claim 1, wherein said mean minimum value is the mean of the ten largest values of a 30-minute mean of said ambient lighting level, and said mean maximal value is the mean of the ten smallest values of said 30-minute mean of said ambient lighting level.

6. The method as in claim 1, wherein said darkness-to-light transition threshold is different and higher than said light-to-darkness transition threshold, whereby minimizing the risk of oscillating between two states.

7. The method as in claim 6, wherein the difference between said darkness-to-light and light-to-darkness transition thresholds is:

$$TDL-TLD=(NLMAX-NLMIN)*0.04$$

TDL being the darkness-to-light transition threshold,
TLD being the light-to-darkness transition threshold,
NLMIN being the mean minimum value, and
NLMAX being the mean maximum value.

8. The method as in claim 7 wherein said darkness-to-light and light-to-darkness transition thresholds are computed according to the following relationships:

$$TDL=NLMIN+(NLMAX-NLMIN)*0.06$$

$$TLD=NLMIN+(NLMAX-NLMIN)*0.02.$$

9. The method as in claim 1, wherein said switching on of the display screen is performed only upon crossing of said darkness-to-light transition threshold for a minimum predetermined period of time and switching off of the display screen is performed only upon crossing of said light-to-darkness transition thresholds for the minimum predetermined time period.

10. The method as in claim 1, wherein said current ambient lighting level to be compared to said darkness-to-light and light-to-darkness transition thresholds is evaluated from successive mean values that are calculated continuously.

11. The method as in claim 10, wherein said successive mean values are calculated either over a first time period or over a second, different time period, selectively as a function of short-term variations in the lighting level.

12. The method as in claim 11, wherein said first time period is a 2-second period and said second time period is a 20-second period.

13. The method as in claim 1, further comprising:
detecting a manipulation of a button of the picture frame by a user, and
ignoring lighting level measurements taken during a period preceding and following said manipulation.

* * * * *